United States Patent

Naoi et al.

Patent Number: 5,723,230
Date of Patent: Mar. 3, 1998

[54] OLIGOSULFIDE TYPE ELECTRODE MATERIAL AND SECONDARY BATTERY CONTAINING SUCH ELECTRODE MATERIAL

[75] Inventors: Katsuhiko Naoi, Koganei; Hiroshi Iizuka; Yasuhiro Suzuki, both of Susono, all of Japan

[73] Assignee: Yazaki Corporation, Tokyo, Japan

[21] Appl. No.: 607,495

[22] Filed: Feb. 27, 1996

[30] Foreign Application Priority Data

Feb. 27, 1995 [JP] Japan ................................. 7-038285
Sep. 11, 1995 [JP] Japan ................................. 7-232770

[51] Int. Cl.$^6$ ................................................ H01M 004/60
[52] U.S. Cl. .......................................... 429/104; 429/213
[58] Field of Search ................................. 429/104, 213

[56] References Cited

U.S. PATENT DOCUMENTS

| | | | |
|---|---|---|---|
| 4,833,048 | 5/1989 | Dejonghe et al. | 429/104 |
| 5,516,598 | 5/1996 | Visco et al. | 429/42 |
| 5,523,179 | 6/1996 | Chu | 429/104 |
| 5,529,860 | 6/1996 | Skotheim et al. | 429/213 |

FOREIGN PATENT DOCUMENTS 5-74459  3/1993  Japan.

*Primary Examiner*—Anthony Skapars
*Attorney, Agent, or Firm*—Nikaido Marmelstein Murray & Oram LLP

[57] ABSTRACT

There is provided a disulfide type electrode material that can realize a remarkably improved energy density if used in a secondary battery as well as a secondary battery that shows a remarkably improved energy density. Such an organic electrode material comprises two or more than two but not more than six continuous S—S bonds.

5 Claims, 4 Drawing Sheets

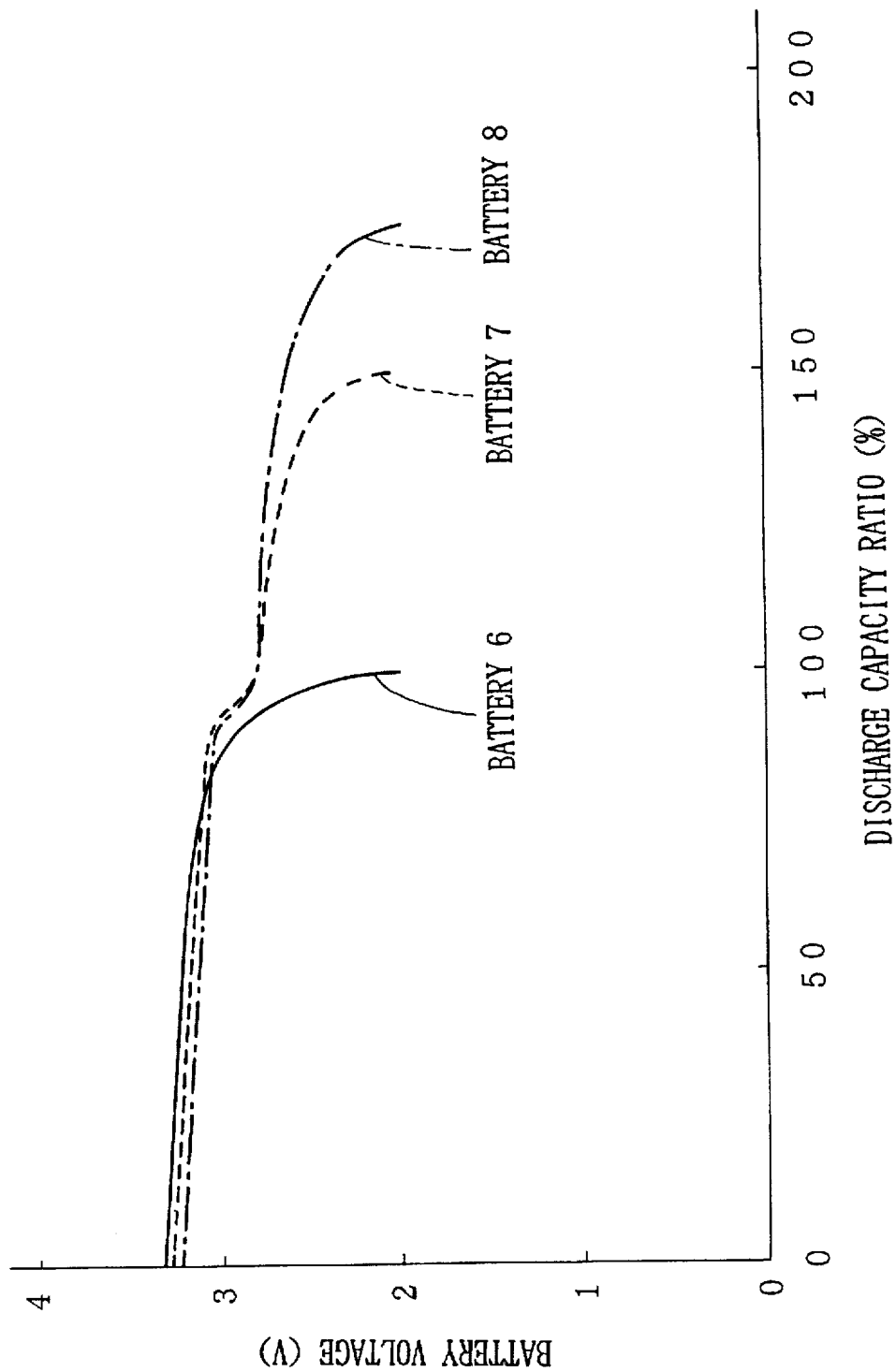

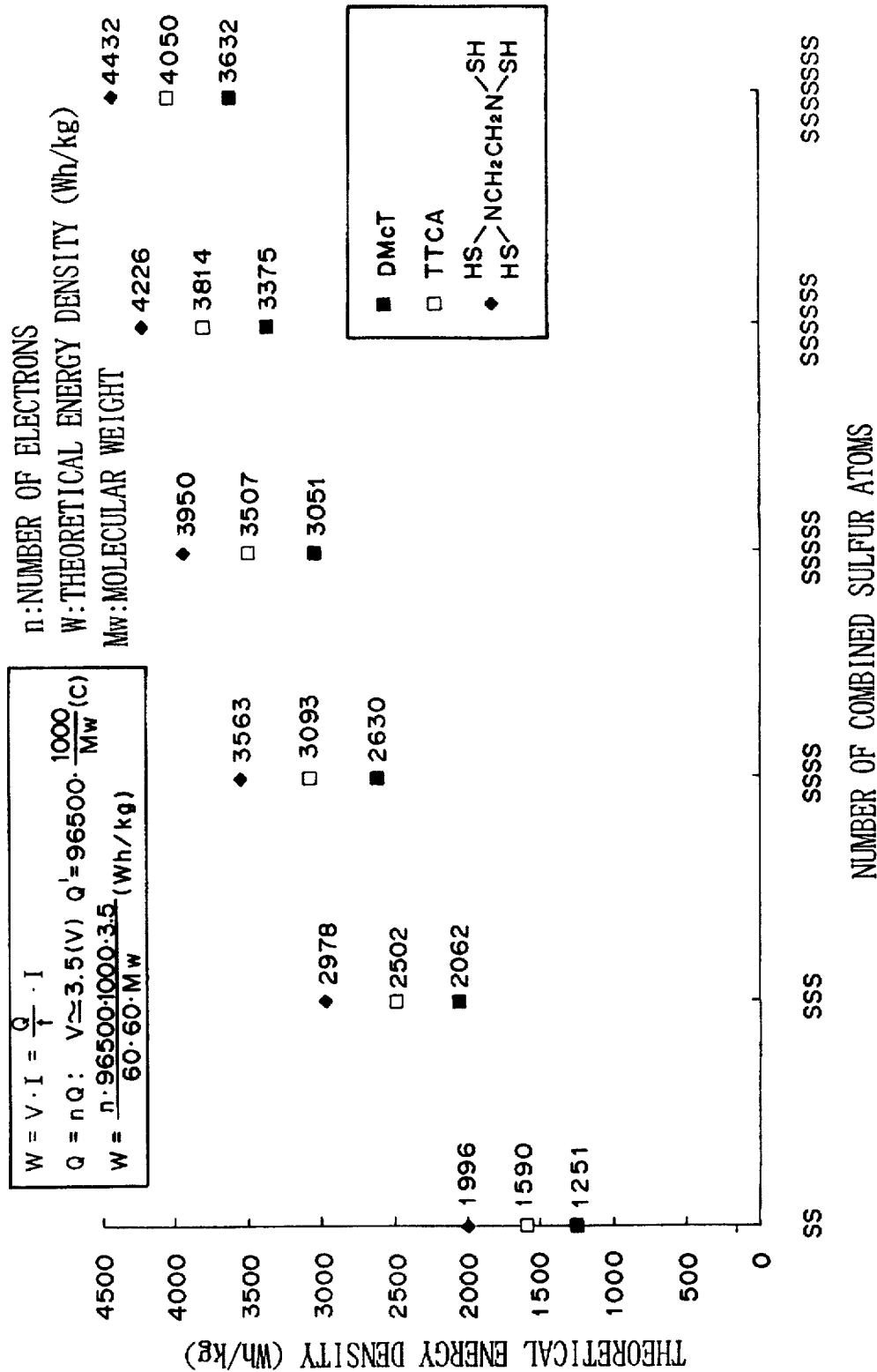

OLIGOSULFIDE TYPE ELECTRODE MATERIAL AND SECONDARY BATTERY CONTAINING SUCH ELECTRODE MATERIAL

BACKGROUND OF THE INVENTION

1. Field of the Invention

This invention relates to an electrode material to be used for a battery and, more particularly, it relates to a sulfide type electrode material.

2. Description of the Prior Art

Efforts have been paid in recent years with remarkable success to produce lightweight and down-sized pieces of automated telecommunications and office equipment. To cope with this trend of down-sizing, there is an increasing demand for highly efficient secondary batteries that can be used for various electric and gears including electric automobiles.

While a number of new electrode materials have been proposed to meet the demand, those comprising a disulfide compound have been attracting attention from the view point of relatively high energy density. (See, inter alia, U.S. Pat. No. 4,833,048.)

A disulfide compound has a so-called disulfide bond realized by two sulfur atoms connecting two organic groups, or (R—S—S—R').

The S—S bond is cleaved when two electrons are given to it in an electrolyte for electrolytic reduction to produce $2(R\text{—}S^-, M^+)$ as it combines with cations or protons ($M^+$) in the electrolyte but the original disulfide bond, or R—S—S—R', is restored to release the two electrons once it is electrolytically oxidized. In a secondary battery utilizing the disulfide bond, an energy density of not lower than 150 Wh/kg, which represents the energy density level of secondary batteries of any other known types, can be expected.

However, as the inventors of the above cited invention report (J. Electrochem. Soc. Vol. 136. No. 9, pp.2570–2575 (1989)), electrons move very slowly in the electrodes of a disulfide type secondary battery and, therefore, it is difficult to produce a large electric current in it at ambient temperature and it has to be heated to 60° C. or higher to make the use of such a battery practically feasible.

Japanese Patent Application Laid-Open No. 5-74459 proposes an electrode material realized by combining an organic compound comprising a disulfide group and a conductive polymeric compound such as polyaniline in an attempt to provide an improved disulfide type secondary battery adapted to a large electric current.

However, since the energy density of any known disulfide type secondary batteries relies on the number of disulfide groups (R—S—S—R') per unit weight, it is theoretically impossible to greatly improve the energy density of such batteries.

SUMMARY OF THE INVENTION

In view of the above circumstances, it is therefore the object of the present invention to provide a disulfide type electrode material that can realize a remarkably improved energy density if used in a secondary battery as well as a secondary battery that shows a remarkably improved energy density.

According to the invention, the above object is achieved by providing an organic electrode material comprising two or more than two but not more than six continuous S—S bonds.

If an organic electrode material of the type under consideration comprises seven or more than seven continuous S—S bonds, they are apt to be separated from each other to produce stable independent molecules and hence such a material is not practically feasible.

If, on the other hand, such an organic electrode material comprises only a single S—S bond, the energy density of the secondary battery using the material is low and it does not provide any advantage if used in a secondary battery.

BRIEF DESCRIPTION OF THE DRAWINGS

FIG. 3 is a graph showing the discharge capacity ratios of battery 6 (Comparative Example) and batteries 4 and 5 (Examples).

FIG. 4 is a chart showing the theoretical energy densities of lithium secondary batteries prepared by using electrode materials according to the invention.

DETAILED DESCRIPTION OF THE PREFERRED EMBODIMENTS

Figures 1A, 1B, 1C:
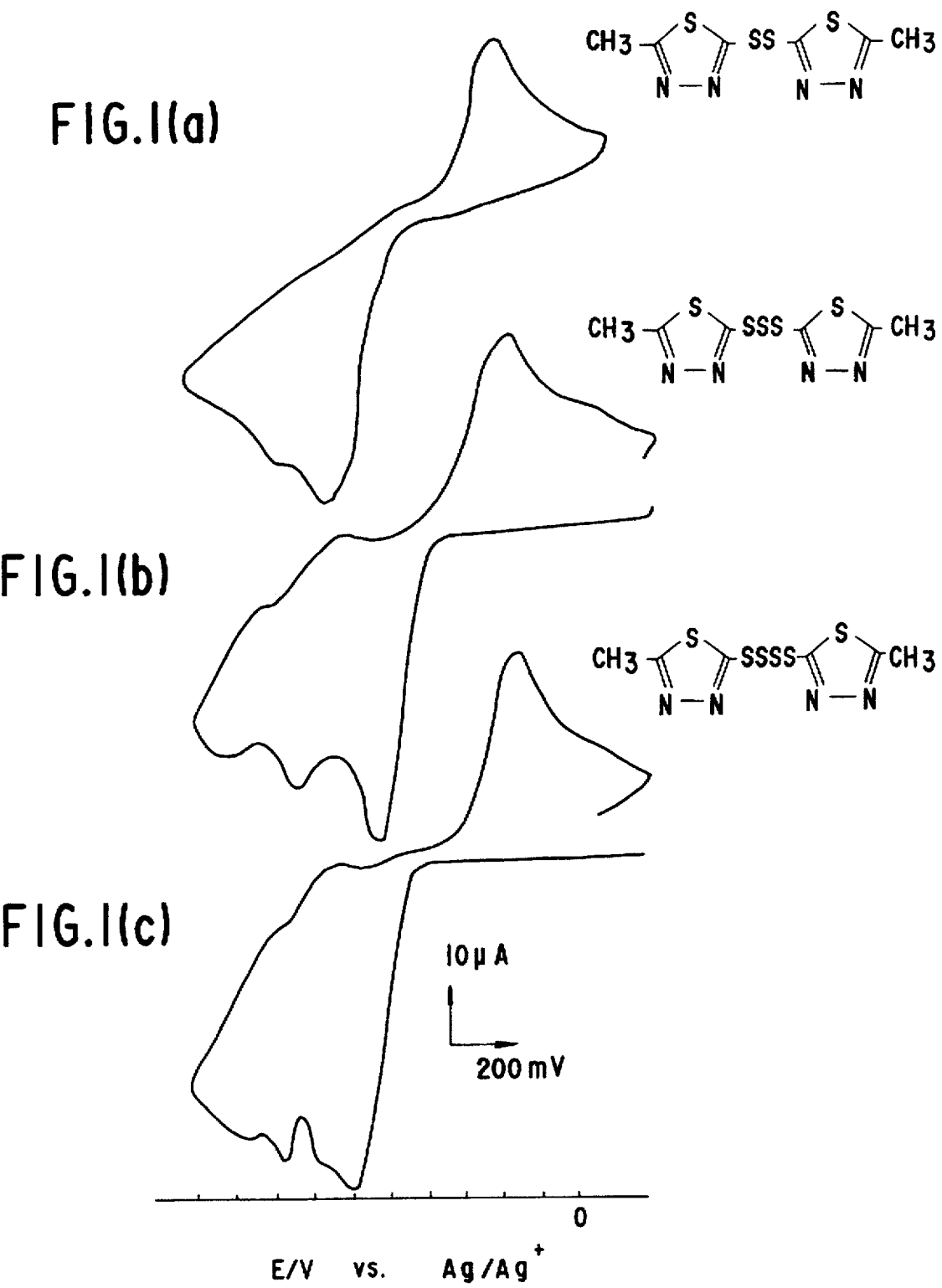
FIG. 1 shows cyclic voltammograms of battery 3 (Comparative Example) and batteries 4 and 5 (Examples) prepared for the purpose of the invention, wherein (a) is a cyclic voltammogram of battery 3, (b) is a cyclic voltammogram of battery 4 and (c) is a cyclic voltammogram of battery 5.

For the purpose of the invention, two or more than two but not more than six continuous S—S bonds are preferably combined with compounds having a plurality of S—H (thiol) groups and a relatively small molecular weight such as 2,5-dimercapt-1,3,4-thiadiazole (hereinafter referred to as "DMcT"), trithiocyanuric acid (hereinafter referred to as "TTCA"), $N,N,N',N'$-tetramercaptethane ($(HS)_2NCH_2CH_2N(SH)_2$), and/or 2-methyl-5-mercapt-1,3,4-thiadiazole (hereinafter referred to as "MMT") by replacing the hydrogen of each thiol group as such chemical combinations can provide an enhanced energy density.

Other compounds that can be used for the purpose of the invention include those expressed by chemical formulas (I) through (XIV) below.

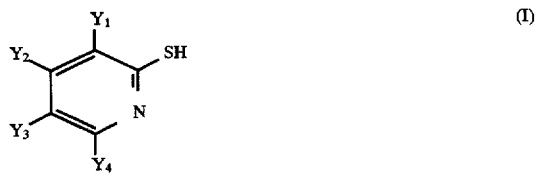

(I)

(II)

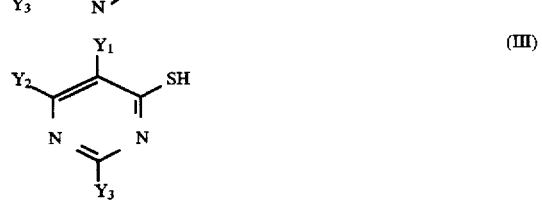

(III)

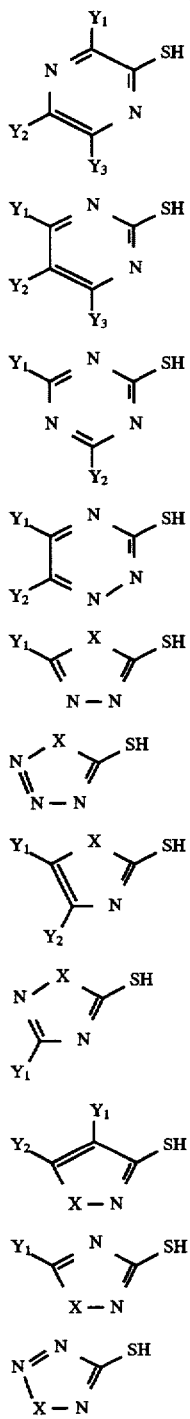

In the above formulas (I) through (XIV), X represents an atom or a group selected from O, S, Se, NH, NR, CH$_2$, CHR, CRR', C=O, C=NH, C=NR and C=S and each of Y$_1$, Y$_2$, Y$_3$ and Y$_4$ represents an aliphatic group such as —CH$_3$ or —C$_2$H$_5$ or a derivative thereof, an aromatic group such as —C$_6$H$_5$ or a derivative thereof, a halogen group such as —F, —Cl, —Br or —I or a group such as —COOR, —NRR', —OR, —COR, —SO$_3$R, —CONRR', —N$^+$ RR'R", —SR, —OCOR, —NHCOR, —N=CRR', —SO$_2$R, —SOR, —SSR, —P(=O)RR', —P(=S)RR', —ONO, —N=C=O, —N=C=S, —OCN, —SCN, —CN, —NO$_2$, —H, —PPR', —P$^+$F, —P$^+$Cl, —P$^+$Br or —P$^+$I, where each of R, R' and R" represents a hydrogen atom, an aliphatic hydrocarbon group or an aromatic hydrocarbon group.

While an electrode material according to the invention may be a polymer, the degree of polymerization of the material is theoretically not related to the energy density achieved by the material.

An electrode material according to the invention may typically be prepared in a manner as described below.

A substance having at least a thiol group in a molecule is dissolved in an organic solvent such as methylene chloride and disulfur dichloride or sulfur dichloride is added to the solution by an amount chemically equivalent to the amount of thiol group in the solution to cause them to react with each other for about 20 hours.

Subsequently, the reaction system is poured into methanol to cause any unreacted disulfur dichloride or sulfur dichloride remaining in the system to react with methanol and produce a decomposed precipitate.

An electrode material according to the invention may alternatively be prepared by dissolving a substance having at least a thiol group in a molecule in diethylether and adding disulfur dichloride or sulfur dichloride to the solution by an amount chemically equivalent to the amount of thiol group in the solution along with pyridine to cause them to react with each other at about −80° C. and subsequently neutralizing the reaction system in an aqueous solution of sodium hydroxide.

Note that an even number of sulfurs are combined together when disulfur dichloride is used as the starting material, whereas an odd number of sulfurs are combined together when the above process starts from sulfur dichloride.

[EXAMPLES]

[Example 1 and Comparative Example 1]

In each of these examples, a tetrasulfide compound of DMcT was prepared as an electrode material in the following manner.

A 1 mol/liter methylene chloride solution of DMcT and a 1 mol/liter methylene chloride solution of disulfur dichloride were mixed and stirred well at room temperature for 20 hours to cause DMcT and disulfur dichloride to react with each other for polymerization. Subsequently, methanol is poured into the reaction system to decompose and remove any unreacted disulfur dichloride.

Then, the reaction product was filtered by means of a glass filter of G4 grade and the substance separated by the filtration was washed with methanol and dried at 60° C. in vacuum to obtain polymer A.

The obtained polymer A was analyzed for the elements of C, H, N and S and found to contain these elements at a ratio of 2:0:2:5. It was determined that the polymer did not contain any other elements such as oxygen. Additionally, it was found by infrared spectrochemical analysis that it comprised C—S and C=N bonds but did not comprise any C—N, N=N or C=S bonds.

Meanwhile, as a result of a mass spectrometric analysis, it was found that no bond between N and S existed there, while there was a fragment of C$_2$, S$_5$, N$_2$, CS$_5$ and NN.

From these analyses, the existence of a C—S—(S)$_n$—S bond (n>1) was confirmed so that it will be safe to assume that the reaction of Chemical Expression 15 below took place to produce polymer A or a polymer of a tetrasulfide compound.

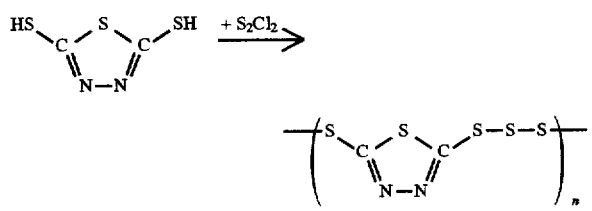

Now, some of the results were obtained when a secondary battery was prepared from an electrode material according to the invention.

Note that the operations described below were conducted in a glove box in which argon was made to flow unless specifically described differently.

A platinum wire with a diameter of 1 mm was connected to a metal plate of lithium with a surface area of 2 cm×2 cm and a height of 0.21 mm. Another similar platinum wire was connected to a graphite-fiber-reinforced graphite plate with the same dimensions and the two plates were arranged vis-a-vis as electrodes for opposite polarities with a porous polypropylene separator having a thickness of 30 μm tightly sandwiched between them to produce an electrode unit. Two electrode units having a same configuration were prepared.

Meanwhile, a solution 1 was prepared by dissolving A dried at 40° C. in vacuum and $LICF_3SO_3$ in γ-butyrolactam to show concentrations of 2 g/l and 1 mol/l respectively.

According to a known method (U.S. Pat. No. 4,833,048), a disulfide compound 1 was prepared. Examining ultraviolet absorption peak at 194 nm and 250 nm in a hexane solvent, the existence of C—S—S—C bond was confirmed in this compound.

A solution 2 was prepared by dissolving said disulfide compound 1 dried at 40° C. in vacuum and $LICF_3SO_3$ in γ-butrolactam to show concentrations of 2 g/l and 1 mol/l respectively.

A 50 ml of Solution 1 and a same amount of Solution 2 were put into respective tall beakers with a capacity of 100 ml and the prepared electrodes were entirely dipped into the respective solutions to produce battery 1 (Example 1) and battery 2 (Comparative Example 2).

Then, each of battery 1 and battery 2 was caused to discharge an electric current of 100 μA until it came to show a voltage equal to 70% of the initial voltage and, thereafter, was electrically recharged by an electric current of 100 μA until it recovered the initial voltage, when it was caused to discharge an electric current again under the same conditions. Then, the two batteries were compared for the quantity of electricity to find that the redischargeable quantity of electricity (a) of battery 1 was 2.2 times as much as the redischargeable quantity of electricity (B) of battery 2.

Thereafter, the electrodes of battery 1 were short circuited and left in this state for 10 hours. At the end of the 10 hours, a small amount of the carbon plate (sample 1A) was collected from the surface thereof and a similarly small amount of specimen (sample 1B) was taken from the battery solution. Then, battery 1 was recharged under the same condition and another specimen (sample 2A) was collected from the surface of the carbon plate, while another specimen (sample 2B) was taken from the battery solution.

After washing samples 1A and 2A with diethylether, they were subjected to a spectrochemical analysis by means of an FT-IR, in which the inside of the analyzing chamber was filled with argon to find the existence of a C—S bond in both samples 1A and 2A. As a result of a laser Raman spectrometric analysis, no S—S group was found in sample 1A, whereas sample 2 proved the existence of an S—S group.

[Examples 2 and 3, Comparative Example 2]

In these examples, secondary batteries were prepared from disulfide, trisulfide and tetrasulfide compounds of 2-methyl-5-mercapt-1,3,4-thiadiazole (MMT).

A disulfide compound of MMT was synthesized in a manner as follows. 10 mmol of MMT and 5 mmol of sodium methoxide were slowly dropped into 30 ml of methanol containing 5 mmol of dissolved iodine and, then, the mixture was stirred for 4 hours.

Thereafter, the reaction system was cooled to −60° C. and the deposit of the precipitate was collected by filtering, dried under reduced pressure and then recrystallized three times in ethanol to produce a disulfide compound of MMT.

A trisulfide compound of MMT was prepared in the following way.

15 mmol of MMT was dissolved into 350 ml of acetonitrile at −20° C. in an argon atmosphere, into which a solution prepared by dissolving 7.5 mmol of sulfur dichloride into 15 ml of acetonitrile was slowly dropped. After the dropping was completed, the aggregate solution was heated to room temperature and 200 ml of acetonitrile was added to it in order to dissolve the produced precipitate.

After the solution was stirred for 24 hours, 200 ml of chloroform was added thereto and then the solvent was removed by evaporation in an evaporator.

Then, the remaining solid product was dissolved into methylene chloride and the solution was filtered to remove any impurities therefrom. Hexane was added to the filtrate to produce a precipitate, which was a trisulfide compound of MMT. Thereafter, the precipitate was dissolved into ethanol and caused to recrystallize for refinement.

A tetrasulfide compound of MMT was prepared in the following manner.

10 mmol of MMT was dissolved into 30 ml of methylene chloride in an argon atmosphere, into which a solution prepared by dissolving 5 mmol of disulfur dichloride into 20 ml of ethylene chloride was slowly dropped. Then, the solution was stirred for 3 hours.

After cooling the reaction system to −60° C., the precipitate was taken out by filtration and the remaining solvent was removed by evaporation under reduced pressure. Thereafter, the precipitate was dissolved into ethanol and caused to recrystallize for refinement to produce a pure tetrasulfide compound of MMT.

Note that, in each of the above described processes of synthesis and filtration, the filtrate often contained the target object and, therefore, it was collected and refined separately, although the procedure of collection and refinement will not be described any further.

It was confirmed that the refined substance was the target object by FAB mass spectrometry and infrared spectrochemical analysis, although the description of this procedure will also be omitted.

Batteries were prepared by using the disulfide, trisulfide and tetrasulfide of MMT. Note that the operations described below were conducted in a glove box in which argon was made to flow.

Three identical electrolytic solutions were prepared by dissolving lithium trifluoromethylsulfonate ($LiCF_3SO_3$) into 30 ml of γ-butyrolactone to a concentration of 2 mmol/liter for each. Then, the above described three sulfides of MMT were dissolved into the respective solutions to a concentration of 5 mmol/liter.

Each of the prepared batteries comprised a sample electrode made of glassy carbon, an opposite electrode of a metal lithium plate and a reference electrode which was a silver-silver ion electrode. The battery containing the MMT disulfide was referred to as battery 3 (Comparative Example 2), while the batteries containing the MMT trisulfide and the MMT tetrasulfide were respectively referred to as battery 4 (Example 2) and battery 5 (Example 3). Then, a cyclic voltammogram was formed on each of the batteries 3, 4 and 5.

The obtained cyclic voltammograms of the batteries 3, 4 and 5 are respectively shown in (a), (b) and (c) of FIG. 1.

From FIG. 1, it is seen that the reduction quantity of electricity that corresponds to the discharge quantity of electricity of battery 3 was 1.6 times greater than that of battery 2 and the reduction quantity of electricity of battery 4 was 1.7 times greater than that of battery 2. In other words, a trisulfide or tetrasulfide compound is electrochemically much more active than a disulfide compound.

[Examples 4 and 5 and Comparative Example 3]

Flat type batteries were prepared in an argon atmosphere respectively from the disulfide, trisulfide and tetrasulfide compounds of MMT of Comparative Examples 2 and Examples 3 and 4 described above and tested under conditions simulating typical working conditions of batteries.

(Preparation of the Positive Electrode)

300 mg of the disulfide of MMT, 30 mg of a dispersant (Brij35, available from Aldrich), 185 mg of lithium perchlorate which is an electrolyte, 70 mg of KETJEN-BLACK and 415 mg of polyethylene oxide were mixed with acetonitrile to produce a dispersed solution of these chemicals. It was then spread on a laboratory dish to volatilize the acetonitrile and obtain a solidified sheet of the mixture having a thickness of 500 μm and a disc was punched out of the sheet to a diameter of 14 mm to produce a positive electrode.

(Preparation of the Solid Electrolyte)

1.5 g of a copolymer of acrylonitrile and methylacrylate was put into a γ-butyrolactone solution containing lithium perchlorate to a concentration of 1 mol/liter and stirred well until the copolymer dispersed evenly in the solution and the mixture was then spread on a laboratory dish heated to 120° C. and then left to cool down to obtain a solidified sheet of the electrolyte having a thickness of 1,500 μm. A disc was punched out of the sheet to a diameter of 16 mm to produce a separator.

(Preparation of the Negative Electrode)

A disc was punched out of a sheet of lithium having a thickness of 400 μm.

(Preparation of the Battery)

Figure 2:
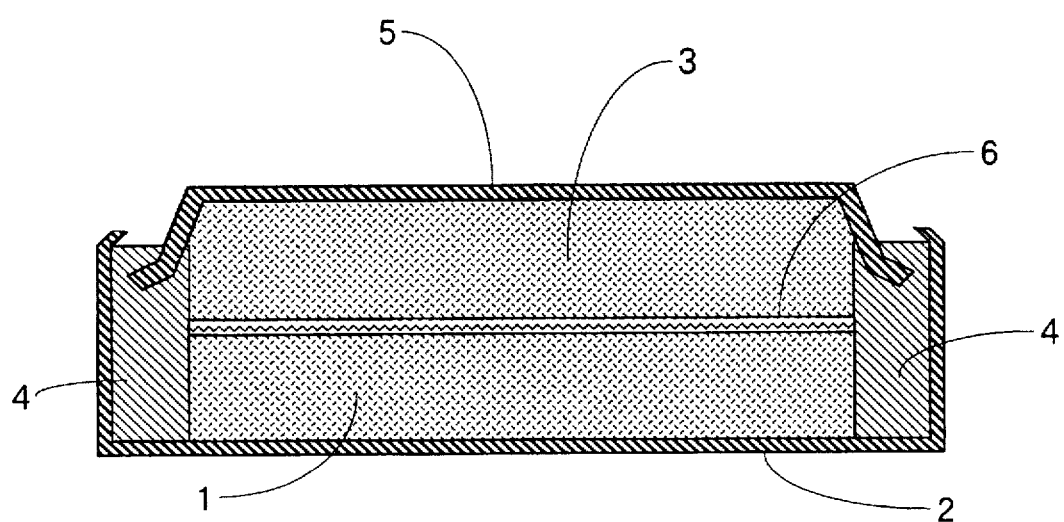
FIG. 2 is a schematic cross sectional view of a flat type battery.

A flat type battery (battery 6: Comparative Example 3) was prepared by using the above positive electrode, separator and the negative electrode. FIG. 2 shows a schematic cross sectional view of the battery. Referring to FIG. 2, the positive electrode 1 was press-fit into a positive electrode can 2. The positive electrode 1 was disposed oppositely relative to the negative electrode 3 of a lithium foil with the separator 6 made of a solidified electrolyte and disposed therebetween. The inside of the positive electrode can 2 and that of the can 5 containing the negative electrode 3 were airtightly sealed by respective packing insulation members.

Battery 7 (Example 4) and battery 8 (Example 5) were prepared in the above described manner by referring to battery 6 except that the trisulfide compound of MMT and the tetrasulfide compound of MMT were respectively used as active substances of the positive electrode.

(Evaluation of the Batteries)

Batteries 6, 7 and 8 were tested for discharge capacity.

Each of the batteries was charged with electricity at a rate of 0.1 CmA for 10 hours and then caused to discharge electricity at a rate of 0.1 CmA until the voltage fell to 2.0 V.

Note that "CmA" is a unit representing the intensity of electric current when the quantity of electricity from a fully charged battery is completely discharged in an hour.

FIG. 3 is a graph showing the discharge performance of each of batteries 6, 7 and 8 obtained by the above test. The horizontal axis of the graph of FIG. 3 represents the discharge capacity ratio expressed in terms of percentage relative to that of battery 6 which is 100%.

From FIG. 3, it will be seen that batteries 7 and 8 had discharge capacities that were respectively 1.5 and 1.8 times greater than that of battery 6 to prove the advantageous effect of a battery according to the invention.

Known sulfide type electrode materials utilize reactions of electrolytic reduction /oxidation of the disulfide groups (R—S—S—R', wherein each of R and R' is an organic group) they comprise and, therefore, only two electrons participate in the reaction of electrolytic reduction/oxidation of each group as seen from the chemical expression below.

On the other hand, an electrode material according to the invention, e.g., a material comprising R—S—(S)n—S—R' (wherein 1≦n≦5 and each of R and R' is an organic group) and n=2 or a tetrasulfide compound, shows a chemical reaction expressed by the chemical expression below.

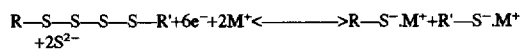

From the above expression, it will be seen that as many as six electrons participate in the reaction of electrolytic reduction/oxidation of each group. In other words, an increased number of electrons per unit weight of a tetrasulfide compound participate in the reaction to raise the energy density of a battery comprising the compound if compared with a battery comprising a disulfide compound.

It will be clear from the above description that, in a disulfide compound formed by polymerization replacing each hydrogen of the two thiol groups of the DMcT molecule with another DMcT to produce an S—S bond, a trisulfide compound, a tetrasulfide compound, a pentasulfide compound, a hexasulfide compound and a heptasulfide compound formed respectively by taking 1 through 5 sulfur atoms into the disulfide bonds of the DMcT molecule, 2, 4, 6, 8, 10 and 12 electrons participate in the reaction of electrolytic reduction /oxidation of each thiol group.

FIG. 4 shows the theoretical energy densities of batteries prepared by using polymers of the above sulfide compounds of DMcT as electrode materials for respective positive electrodes and lithium for the negative electrodes, the electromotive force being uniformly 3.5 V for all the batteries.

FIG. 4 also shows the theoretical energy densities of batteries respectively prepared by using polymers of disulfide, trisulfide, tetrasulfide, pentasulfide, hexasulfide and heptasulfide compounds of trithiocyanuric acid (TTCA) and N,N,N',N'-tetramercaptethane ((HS)$_2$NCH$_2$CH$_2$N(SH)$_2$). A polymer of a tetrasulfide compound of TTCA reacts for oxidation and reduction in a manner as shown by expression below.

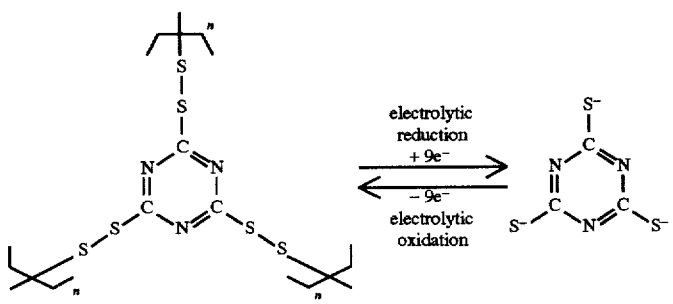

From FIG. 4, it will be seen that a battery realized by using an electrode material according to the invention shows a theoretical energy density by far higher than that of a conventional battery using a polymer of a disulfide compound. In other words, an electrode material according to the invention operates excellently if used in a battery.

Thus, it is clear from the above description that a secondary battery prepared by using an electrode material according to the invention shows an energy density by far higher than that of a conventional battery realized by using an electrode material of a disulfide compound.

While preferred embodiments of the invention have been described using specific terms, such description is for illustrative purpose only, and it is to be understood that changes and variations may be made without departing from the spirit or scope of the following claims.

What is claimed is:

1. An organic electrode material comprising:
   S—S bonds which are of two or more than two but not more than six continuous bonds.

2. An organic electrode material according to claim 1, wherein said material is expressed by chemical formula R—S—(S)$_n$—S—R'

(where, $1 \leq n \leq 5$ and each of R and R' is an organic group).

3. A secondary battery comprising:
   an organic electrode material having S—S bonds which are of two or more than two but not more than six continuous bonds.

4. A secondary battery according to claim 3, wherein it comprises an organic electrode material expressed by chemical formula R—S—(S)$_n$—S—R'

(where, $1 \leq n \leq 5$ and each of R and R' is an organic group).

5. A secondary battery comprising:
   an organic electrode material expressed by the chemical formula

R"—S—M where R" is a compound having a 5- or 6- membered ring containing nitrogen atoms, a carbon constituting said ring in R" being bonded to a sulfur, a nitrogen atom similarly constituting said ring being double-bonded to said carbon, and M is a metal or hydrogen atom; and
   an electrolyte including a metal sulfide.

* * * * *